United States Patent [19]

Andrews et al.

[11] 4,294,882
[45] Oct. 13, 1981

[54] HEAT-SEALABLE ANTISTATIC POLYPROPYLENE FILMS

[75] Inventors: William J. Andrews, Taunton; David J. C. Espley; William J. M. Philpott, both of Bridgewater, all of England

[73] Assignee: British Cellophane Limited, Somerset, England

[21] Appl. No.: 69,089

[22] Filed: Aug. 23, 1979

[30] Foreign Application Priority Data

Sep. 19, 1978 [GB] United Kingdom ............... 37295/78

[51] Int. Cl.$^3$ ...................... B32B 27/08; B29C 19/00; B32B 27/00
[52] U.S. Cl. .................... 428/349; 156/308.4; 156/229; 156/244.11; 156/243; 428/516; 525/3; 260/DIG. 15
[58] Field of Search ....................... 428/516, 500, 349; 525/3; 260/DIG. 15, DIG. 16, DIG. 21; 156/308.4, 229, 244.11, 243

[56] References Cited

U.S. PATENT DOCUMENTS

| | | | |
|---|---|---|---|
| 3,592,879 | 7/1971 | Ott et al. ................................. | 525/3 |
| 3,936,422 | 2/1976 | Wirth et al. ............................ | 525/3 |
| 4,117,193 | 11/1977 | Tsuchiya et al. ..................... | 428/516 |
| 4,123,475 | 10/1978 | Abolins et al. ......................... | 523/3 |

FOREIGN PATENT DOCUMENTS 1145199  3/1969  United Kingdom .
1440317  6/1976  United Kingdom .

Primary Examiner—George F. Lesmes
Assistant Examiner—E. Rollins Buffalow
Attorney, Agent, or Firm—Watson, Cole, Grindle & Watson

[57] ABSTRACT

An oriented heat-sealable antistatic polypropylene film is manufactured by applying to one or both surfaces of a base polypropylene film, preferably by co-extrusion, a layer of a heat-sealable olefinic polymer (for example, a predominantly linear random copolymer of ethylene with butene-1) containing between 0.2 and 10% by weight of an anionic hydrocarbyl (preferably long chain alkyl) sulphonate. A slip agent, for example oleamide, may also be incorporated in the base polypropylene film. The antistatic film has improved heat-sealing properties which permits it to be run successfully on packaging machinery at high speeds.

17 Claims, No Drawings

HEAT-SEALABLE ANTISTATIC POLYPROPYLENE FILMS

This invention relates to heat-sealable, antistatic polypropylene films.

Polypropylene film is well known for use as a packaging material. It has high clarity, excellent barrier properties with respect to water vapor, and excellent strength, particularly when its molecular structure has been oriented by stretching in one or preferably two directions at right angles to each other while subjected to a temperature in the range between 2° C. below the crystalline melting point of the polypropylene and its second order transition temperature.

Although polypropylene film is inherently heat-sealable to itself and is capable of forming heat-seals of adequate strength at temperatures of about 160° C., at such temperatures and down to about 140° C., oriented polypropylene film will shrink and produce undesirable buckling in the region of the heat-seal.

It is known to overcome this distortion problem by forming on one or both surfaces of the oriented polypropylene film a layer of a heat-sealable polymer or copolymer capable of forming heat-seals of adequate strength at temperatures below the temperature at which heat distortion occurs to any significant extent in the base oriented polypropylene film.

One such known heat-sealable copolymer applied to one or both surfaces of an oriented base polypropylene film is a propylene/ethylene copolymer in which the ethylene content lies in the range between 2% and 6% by weight, as is described in British Pat. No. 1145199. Another such known heat-sealable copolymer is a predominantly linear random copolymer of ethylene with at least one further alpha olefin having at least three carbon atoms per molecule, present up to about 12 mole percent in the copolymer, such as is described in our British Pat. No. 1440317.

Base oriented polypropylene film having a layer of a heat-sealable polymer or copolymer on one or both surfaces is hereinafter referred to as a "heat-sealable polypropylene film".

Heat-sealable polypropylene films readily acquire electrostatic charges which give rise to poor unwinding properties, a tendency to cling to machine parts on packaging machinery and a tendency to pick up dust from the surrounding atmosphere. It is known to reduce the electrostatic charges by incorporating into the base polypropylene film a non-ionic antistatic agent, such as an ethoxylated alkyl amine, an ethoxylated alkyl amide or a glyceryl ester, followed by treatment of the heat-sealable polypropylene film with a corona discharge to render the agent active. The essential treatment with the corona discharge, however, reduces the heat-seal strength of the heat-sealable polypropylene film, particularly if a slip agent has also been incorporated in the film to confer slip properties upon the film.

The heat-seal strength is measured by superposing a pair of strips of the film, 38 millimeters wide, sealing the pair together between heat-seal jaws towards one end under a pressure of 1 kilogram per square centimeter for a dwell time of one second and then measuring the force in grams required to peel the strips apart. For most purposes, the minimum acceptable heat-seal strength of the film when sealed between plain heat-seal jaws is 300 grams/38 millimeters. The heat-seal strength decreases with the temperature of heat-sealing and the minimum temperature required to effect a heat-seal strength of 300 grams/38 millimeters is hereinafter referred to as the "heat-seal threshold temperature".

The heat-seal threshold temperature limits the speed at which heat-sealable polypropylene film can be run on packaging machinery. The lower the heat-seal threshold temperature the greater the scope for achieving acceptable heat-seal strengths during high speed heat-seal operations where the dwell time of the heat-seal jaws is very short.

Ionic antistatic agents, such as quaternary alkyl ammonium salts or metallic alkyl sulphates are insufficiently heat-stable for incorporation in the base polypropylene film and the more heat-stable anionic hydrocarbyl, e.g., alkyl, sulphonates when added to the base polypropylene film do not give rise to antistatic activity.

SUMMARY OF THE INVENTION

It has now been found, however, that if anionic hydrocarbyl sulphonates are added to the heat-sealable polymer or copolymer layers prior to application of the layers to the base oriented polypropylene film, excellent antistatic properties are conferred upon the heat-sealable polypropylene film without any need to activate by treatment with a corona discharge.

In the absence of the corona discharge treatment, the heat-seal strength of the heat-sealable antistatic polyproplyene remains unaffected and, thus, in view of a lower heat-seal threshold temperature than hitherto achieved in heat-sealable antistatic polypropylene film where corona discharge activation has been required, the film may be run at higher speeds on packaging machines.

According to the present invention, a method for the manufacture of an oriented heat-sealable antistatic polypropylene film comprises applying to one or both sides of a base polypropylene film a layer of a heat-sealable olefinic polymer capable of forming a heat-seal below 140° C., the olefinic polymer layer containing between 0.2 and 10.0% by weight of an anionic hydrocarbyl sulphate and stretching the combination in one or more directions under stretch orientatable conditions.

It will be readily appreciated by one skilled in the art that the term "base polypropylene film" includes a film of propylene homopolymer, a copolymer of propylene with a minor amount (e.g. up to 15%) of a further olefin such as ethylene, or a blend of such a homopolymer with a small proportion of a compatible polyolefin which does not significantly affect the physical properties of the film.

It is highly preferred that the hydrocarbyl group of the anionic hydrocarbyl sulphonate should be a long chain alkyl group, preferably containing at least ten carbon atoms, more preferably between twelve and eighteen carbon atoms.

Preferably the anionic hydrocarbyl sulphonate is present in the olefinic layer by an amount in the range between 0.3 and 2.0% by weight.

The heat-sealable olefinic polymer may be applied to the base polypropylene film by any one of the known methods. For example, preformed film or films of the olefinic polymer containing the anionic hydrocarbyl sulphonate may be laminated to a preformed base polypropylene film by a suitable adhesive or by stretching the preformed films while in intimate contact when the combination combines to form a unitary film. Alternatively, the olefinic polymer containing the anionic hydrocarbyl sulphonate may be melt extruded on one or both sides of a preformed base polypropylene film. Preferably, however, the heat-sealable polypropylene film is formed by co-extruding the base polypropylene film with a layer of the olefinic polymer containing the anionic hydrocarbyl sulphonate on one or both sides through a slot or annular die orifice followed by quenching.

The olefinic polymer may be any of the conventional heat-sealable olefinic polymers or copolymers applied to base polypropylene film including low density polyethylene, random copolymers of propylene with ethylene and/or butene-1 having a major content of propylene and predominantly linear random copolymer of ethylene with propylene and/or butene-1 having a major content of ethylene.

The slip properties of the heat-sealable polypropylene film may be enhanced by incorporating into the base polypropylene film a slip agent, for example oleamide, in an amount in the range between 0.05% and 5.0% by weight. The slip agent migrates to the surface of the film.

The invention also includes an oriented heat-sealable antistatic polypropylene film comprising a base polypropylene film having on one or both surfaces a layer of an olefinic polymer capable of forming a heat-seal below 140° C., the olefinic polymer layer containing between 0.2 and 10% by weight of an anionic hydrocarbyl sulphonate.

The invention will now be more specifically described with reference to the following Examples:

EXAMPLE 1

In a number of experimental runs a polypropylene melt was co-extruded through a slot die at 2 meters/minute between two outer layers of a melt of a predominantly linear random copolymer of ethylene and butene-1 having a butene-1 content of 6% by weight, thus forming a three-layered molten film approximately 1,100 microns in thickness. The polypropylene constituted 92% of the thickness and each copolymer layer 4% of the thickness.

In the various runs, the ethylene/butene-1 copolymer melt in both outer layers contained between 0% and 2.0% by weight of an antistatic agent consisting of a mixture of sodium alkyl sulphonates in which the alkyl groups had chain lengths of between 12 and 18 carbon atoms. Further, the polypropylene melt contained between 0% and 1.0% by weight of a slip agent consisting of oleamide.

The molten film was quenched on a chill roller and was then heated to a temperature of above 80° C. and stretched 5:1 in the machine direction between sets of nip rollers in which the rollers at the output end were rotated at a greater peripheral speed than the rollers at the input end. The uniaxially stretched film was then led into a stenter where it was stretched transversely to 9 times its original width. The film now biaxially oriented, was cooled, trimmed at the edges and wound into a roll. The resulting film had high clarity and was approximately 25 microns in thickness.

The slip, antistatic activity and heat-seal threshold temperature was measured in the resulting samples.

The slip was determined by fixing a sample of the film to a rectangular metal block 500 grams in weight and placing the block on to an inclined plane covered with a similar sample of film. The angle of the plane was increased until the block just commenced to slide and the cotangent of the angle of inclination was taken as the slip coefficient.

The antistatic activity of the samples was assessed from an electrometer test and a measurement of surface resistance. In the electrometer test, a strip of a sample of the film 2.5 centimeters by 11.5 centimeters was hung over a horizontal electrode with the ends approximately at the same level and a charge of 5,000 volts was applied to the electrode. The time taken for the two arms of the strip to part and describe an angle of 90° was measured. A period less than about 1 second was taken to indicate fair to good antistatic activity.

In the resistance test a sample of film was pressed into contact with a pair of copper electrodes 2.5 centimeters wide and separated by a gap of 1 millimeter. A potential difference of 500 volts was applied across the electrodes and the current flowing was measured.

From the result the resistance offered by the surface of the sample was calculated in ohms/square. The antistatic activity of the surface of the sample was considered to be good when the resistance was about $10^{11}$ ohms/square and below.

By way of control, the experimental runs were repeated except that in each run the sodium alkyl sulphonate was omitted from the ethylene/butene-1 copolymer melt and a conventional non-ionic antistatic agent consisting of a mixture of 75 parts by weight of glyceryl monostearate and 25 parts by weight of a bisethoxylated alkyl amine derived from tallow was incorporated in the polypropylene melt amounting to 1.0% by weight. Half the sample films obtained on each run were treated with a corona discharge sufficient to activate the antistatic agent and measurement of slip, antistatic activity and heat-seal threshold temperature were made on both the treated and untreated samples.

The results obtained are shown in Table 1.

TABLE 1

| Anti-Static Agent | % by weight anti-static agent | % by weight slip agent | Slip coefficient (cotan θ) | Corona Discharge Treatment | Electrometer Test (Seconds) | Surface Resistance (Ohms/sq.) | Antistatic Assessment | Heat-Seal Threshold °C. (for 300 gms/ 38 mms. Plain Jaws) |
|---|---|---|---|---|---|---|---|---|
| A | 0 | 0 | 2.9 | U | >60 | >$10^{13}$ | BAD | 112° |
| A | 0.3 | 0 | 2.9 | U | <½ | $10^{11}$ | GOOD | 112° |
| A | 0.5 | 0 | 2.9 | U | <½ | $8 \times 10^{11}$ | GOOD | 112° |
| A | 0.5 | 0.5 | 5.2 | U | <½ | $2 \times 10^{11}$ | GOOD | 110° |
| A | 0.5 | 1.0 | 8.5 | U | <½ | $5 \times 10^{11}$ | GOOD | 111° |
| A | 0.75 | 0 | 2.9 | U | <½ | $5 \times 10^{10}$ | GOOD | 111° |
| A | 1.0 | 0 | 2.9 | U | <½ | $5 \times 10^{10}$ | GOOD | 112° |
| A | 2.0 | 0 | 2.9 | U | <½ | $3 \times 10^{10}$ | GOOD | 113° |
| B | 1.0 | 0 | 2.9 | U | >60 | >$10^{13}$ | BAD | 112° |
| B | 1.0 | 0 | 2.9 | T | <1 | $10^{12}$ | FAIR | 118° |
| B | 1.0 | 0.2 | 3.4 | U | >60 | >$10^{13}$ | BAD | 110° |

TABLE 1-continued

| Anti-Static Agent | % by weight anti-static agent | % by weight slip agent | Slip coefficient (cotan θ) | Corona Discharge Treatment | Electro-meter Test (Seconds) | Surface Resistance (Ohms/sq.) | Anti-static Assessment | Heat-Seal Threshold °C. (for 300 gms/ 38 mms. Plain Jaws) |
|---|---|---|---|---|---|---|---|---|
| B | 1.0 | 0.2 | 3.4 | T | <1 | $10^{12}$ | FAIR | 120° |
| B | 1.0 | 0.5 | 5.2 | U | >60 | $>10^{13}$ | BAD | 110° |
| B | 1.0 | 0.5 | 5.2 | T | <1 | $10^{12}$ | FAIR | 142° |
| B | 1.0 | 1.0 | 8.5 | U | >60 | $>10^{13}$ | BAD | 112° |
| B | 1.0 | 1.0 | 8.5 | T | <1 | $10^{12}$ | FAIR | 145° |

A is sodium alkyl sulphonate added to the ethylene/butene-1 copolymer.
B is 75/25 glyceryl monostearate/bisethoxylated alkyl amine added to the base polypropylene
U is untreated.
T is treated A further experimental run was conducted with sodium alkyl sulphonate as the sole antistatic agent added by an amount of 2.0% by weight to the polypropylene melt. No antistatic activity was observed in the sample film.

EXAMPLE 2

Two experimental runs were conducted as described in Example 1 except that the two outer layers of melt applied to the polypropylene melt consisted of a random copolymer of propylene and ethylene in which the ethylene content was 3.5% by weight. Sodium alkyl sulphonate, in which the alkyl groups had chain lengths of between 12 and 18 carbon atoms, was incorporated in the propylene/ethylene copolymer in amounts of 1.0% and 2.0% by weight respectively. The slip antistatic activity and heat-seal threshold temperature was measured in the resulting samples.

By way of control the experimental run was repeated except that the sodium alkyl sulphonate was omitted and non-ionic antistatic agent consisting of a mixture of 75 parts by weight of glyceryl monostearate and 25 parts by weight of a bisethoxylated alkyl amine derived from tallow was added to the polypropylene melt in an amount of 1.0% by weight. Half the resulting samples were treated with a corona discharge treatment to activate the antistatic agent and both untreated and treated were tested as before.

The results obtained are shown in Table 2.

TABLE 2

| Anti-Static Agent | % by weight anti-static agent | % by weight slip agent | Slip coefficient (cotan θ) | Corona Discharge Treatment | Electro-meter Test (Seconds) | Surface Resistance (Ohms/sq.) | Anti-static Assessment | Heat-Seal Threshold °C. (for 300 gms/ 38 mms. Plain Jaws) |
|---|---|---|---|---|---|---|---|---|
| A | 1.0 | 0 | 2.9 | U | <½ | $10^{11}$ | GOOD | 128 |
| A | 2.0 | 0 | 2.9 | U | <½ | $5 \times 10^{10}$ | GOOD | 128 |
| B | 1.0 | 0 | 2.9 | U | >60 | $>10^{13}$ | BAD | 128 |
| B | 1.0 | 0 | 2.9 | T | <1 | $10^{12}$ | FAIR | 132 |

A is sodium alkyl sulphonate added to the propylene/ethylene copolymer.
B is 75/25 glyceryl monostearate/bisethoxylated alkyl amine added to the base polypropylene.
U is untreated.
T is treated.

The oriented heat-sealable antistatic polypropylene films having antistatic heat-sealable layers on both surfaces manufactured in accordance with the invention are particularly useful in overwrapping applications performed on high speed packaging machines. The films combine excellent antistatic properties and heat-seal threshold temperature, with, if required, excellent slip properties.

The oriented heat-sealable antistatic polypropylene film having an antistatic heat-sealable layer on one surface only may be laminated on the other surface to another synthetic plastics film separately having good antistatic properties.

We claim:

1. A method for the manufacture of an oriented heat-sealable antistatic polypropylene film comprising applying to one or both sides of a base polypropylene film a layer of a heat-sealable olefinic polymer capable of forming a heat-seal below 140° C., the olefinic polymer layer containing between 0.2 and 10% by weight of an antistatic agent comprising an anionic hydrocarbyl sulphonate, and stretching the combination in one or more directions under stretch orientatable conditions.

2. A method as claimed in claim 1 in which the anionic hydrocarbyl sulphonate is present in the olefinic polymer in an amount in the range between 0.3 and 2.0% by weight.

3. A method as claimed in claim 1 in which the slip agent is incorporated in the base polypropylene film in an amount in the range between 0.05 and 5.0% by weight.

4. A method as claimed in claim 1 in which the base polypropylene film is co-extruded with one or between two layers of the heat-sealable olefinic polymer through a slot or annular die orifice followed by quenching.

5. A method as claimed in claim 1 in which the hydrocarbyl group in the anionic hydrocarbyl sulphonate is a long chain alkyl group.

6. A method as claimed in claim 5 wherein the long chain alkyl group contains at least 10 carbon atoms.

7. A method as claimed in claim 6 wherein the long chain alkyl group contains from 12 to 18 carbon atoms.

8. A method as claimed in claim 1 in which the olefinic polymer is polyethylene.

9. A method as claimed in claim 1 in which the olefinic polymer is a random copolymer of propylene with ethylene and/or butene-1 having a major content of propylene.

10. A method as claimed in claim 1 in which the olefinic polymer is a predominantly linear random copolymer of ethylene with propylene and/or butene-1 having a major content of ethylene.

11. A method as claimed in claim 1 in which said antistatic agent consists of said anionic hydrocarbyl sulphonate.

12. An oriented heat-sealable antistatic polypropylene film comprising a base polypropylene film having on one or both surfaces a layer of an olefinic polymer capable of forming a heat-seal below 140° C., the olefinic polymer layer containing between 0.2 and 10% by weight of an antistatic agent comprising an anionic hydrocarbyl sulphonate.

13. A polypropylene film as claimed in claim 12 in which the olefinic polymer layer contains between 0.3 and 2.0% by weight of the anionic hydrocarbyl sulphonate.

14. A polypropylene film as claimed in claim 12 wherein the hydrocarbyl group in the anionic hydrocarbyl sulphonate is a long chain alkyl group.

15. A polypropylene film as claimed in claim 14 wherein the long chain alkyl group contains from 12 to 18 carbon atoms.

16. A polypropylene film as claimed in claim 12 in which on manufacture the base polypropylene film contains between 0.05 and 5.0% by weight of a slip agent.

17. A polypropylene film as claimed in claim 12 in which said antistatic agent consists of said anionic hydrocarbyl sulphonate.

* * * * *